United States Patent
Arunkumar et al.

(10) Patent No.: US 10,318,796 B2
(45) Date of Patent: Jun. 11, 2019

(54) AGE PROGRESSION OF SUBJECT FACIAL IMAGE

(71) Applicant: INTERNATIONAL BUSINESS MACHINES CORPORATION, Armonk, NY (US)

(72) Inventors: Saritha Arunkumar, Basingstoke (GB); Nalini K. Ratha, White Plains, NY (US); Christos Sagonas, London (GB); Peter W. Waggett, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 307 days.

(21) Appl. No.: 15/347,997

(22) Filed: Nov. 10, 2016

(65) Prior Publication Data

US 2018/0129867 A1 May 10, 2018

(51) Int. Cl.
*G06K 9/00* (2006.01)

(52) U.S. Cl.
CPC ..... *G06K 9/00268* (2013.01); *G06K 9/00228* (2013.01)

(58) Field of Classification Search
CPC ........... G06K 9/00288; G06K 9/00228; G06K 9/00268
See application file for complete search history.

(56) References Cited

U.S. PATENT DOCUMENTS

| 8,705,875 | B1 * | 4/2014 | Ricanek, Jr. | ....... | G06K 9/00288 382/159 |
| 8,913,839 | B2 * | 12/2014 | Ricanek, Jr. | ....... | G06K 9/00221 382/159 |

(Continued)

FOREIGN PATENT DOCUMENTS

| CN | 101556699 A | 10/2009 |
| WO | WO 2009/014832 A2 | 1/2009 |

OTHER PUBLICATIONS

Narayanan Ramanathan and Rama Chellappa; "Modeling Shape and Textural Variations in Aging Faces"; IEEE 2008.*

(Continued)

*Primary Examiner* — Shaghayegh Azima
(74) *Attorney, Agent, or Firm* — Brian Restauro, Esq.; Kevin P. Radigan, Esq.; Heslin Rothenberg Farley & Mesiti P.C.

(57) ABSTRACT

Age progression of a test facial image is facilitated by compiling training data, including a training set(s) having selected initial images of subjects by gender and age-group. In addition, the age progression includes manipulating the training data, including: for a given age-group of a training set, substantially aligning respective face shapes; determining a common frame based on the aligned shapes; substantially aligning respective face appearances to generate a shape-free form corresponding to the face appearance of each subject, using the substantially aligned shapes to generate an age-specific shape-dictionary for each age-group, and a common shape-dictionary for the age-groups of the (Continued)

training set, and using the aligned appearances to generate at least an age-specific appearance-dictionary for each age-group, and a common appearance-dictionary for the age-groups of the training set. The age specific appearance dictionary for each age group and the common appearance dictionary facilitate age progression of the facial image.

12 Claims, 6 Drawing Sheets

(56) References Cited

U.S. PATENT DOCUMENTS

| | | | | |
|---|---|---|---|---|
| 2009/0226045 | A1* | 9/2009 | Aggarwal | G06K 9/00275 382/118 |
| 2014/0099029 | A1* | 4/2014 | Savvides | G06K 9/481 382/197 |

OTHER PUBLICATIONS

International Business Machines Corporation (IBM), "z/Architecture Principles of Operation," IBM® Publication No. SA22-7832-10, Eleventh Edition, Mar. 2015, pp. 1-1732.

International Business Machines Corporation (IBM), "Power ISA™ Version 2.07B," International Business Machines Corporation, Apr. 9, 2015, pp. 1-1527.

Burt et al., "Perception of Agent in Adult Caucasian Male Faces: Computer Graphic Manipulation of Shape and Colour Information", Proc. R. Soc. Land B, The Royal Society, vol. 259 (1995) (pp. 137-143).

Lanitis et al., "Toward Automatic Simulation of Aging Effects on Face Images", IEEE Transactions on Pattern Analysis and Machine Intelligence, vol. 24, No. 4 (Apr. 2002) (pp. 422-455).

Gandhi et al., "A Method for Automatic Synthesis of Aged Human Facial Images", Centre for Intelligent Machines, McGill University, Montreal, Quebec, Canada (2004) (43 pages) (no further date information available).

Ramanathan et al., "Modeling Age Progression in Young Faces", IEEE Computer Society Conference on Computer Vision and Pattern Recognition (CVPR'06) (2006) (8 pages) (no further date information available).

Scandrett et al., "A Person-Specific, Rigorous Aging Model of the Human Face", Pattern Recognition Letters. vol. 27 (2006) (pp. 1776-1787).

Scherbaum et al., "Prediction of Individual Non-Linear Aging Trajectories of Faces", Eurographics, vol. 26, No. 3 (2007) (10 pages).

Ramanathan et al., "Modeling Shape and Textural Variations in Aging Faces", University of Maryland, College Park, USA (2008) (8 pages) (no further date information available).

Suo et al., "A Compositional and Dynamic Model for Face Aging", IEEE Transactions on Pattern Analysis and Machine Intelligence, vol. 32, No. 3 (Mar. 2010) (pp. 385-401).

Shen et al., "Exemplar-Based Age Progression Prediction in Children Faces", IEEE Computer Society International Symposium on Multimedia (2011) (pp. 123-128) (no further date information available).

Hsu et al., "Face Aging Software Can Show Your Child's Future", http://spectrum.ieee.org/tech-talk/computing/software/face-aging-software . . . , downloaded Apr. 10, 2014 (2 pages).

Kemelmacher-Schlizerman et al., "Illumination-Aware Age Progression", IEEE Computer Society Conference on Computer Vision and Pattern Recognition (CVPR'14) (Sep. 2014).

Shu et al., "Personalized Age Progression with Aging Dictionary", Nanjing University—School of Computer Science & Engineering & National University of Singapore—Department of Electrical and Computer Engineering, Oct. 22, 2015 (pp. 4321-4329).

YouTube, "Swipe | Mind-Control Star Wars Droid & IBM Technology That Ages You", https://www.youtube.com/watch?v=v7tHIFvfvIM, Published Aug. 12, 2016 (1 page).

Arunkumar, S., "Fully Automatic Method for Robust Age Progression", IBM Emerging Technologies Blog, http://blog.ibmjstart.net/2016/09/06/fully-automatic-method-robust-age-progression/, Published Sep. 6, 2016 (8 pages).

* cited by examiner

AGE PROGRESSION OF SUBJECT FACIAL IMAGE

BACKGROUND

The face of a subject includes identification features that may provide information specific to that subject. Such information may, for example, include the identity, gender, age, ethnicity, facial expression, and so forth, of the subject.

Recently, further efforts have been made to develop methods that may facilitate automated recognition and/or verification of the identity of a subject with robustness to different variations, such as, for example, poses, illumination conditions and/or occlusions, and aspiring to human performance capability.

A problem that may be associated with some of these methods is that they are developed on a basis of a training image gallery including various images collected for a subject in a given age. Naturally, the performance capability of such previously-proposed methods is reduced when applied to the facial progression of subjects in ages differing from that used in the compilation of the training image gallery. Such reduced performance capability may be attributed to the fact that age progression is a relatively complex process that may affect at least one of a shape and appearance of the face of a subject. It may be possible to improve the performance capability of such previously-proposed methods by updating the training image gallery with images of the given subject in different ages, but this is relatively time and resource consuming.

Regarding the age progression of the face of a given subject in different age-groups, some previously-proposed methods in this regard may be limited by: the requisite of a minimum age of the subject in an input image that is to be processed and/or for such an input image to be in a frontal pose with a neutral expression; sensitivity to any kind of occlusions, such as, for example, hair, sunglasses and so forth, and such age progression is not performed with consideration to the progression of both appearance and face shape of the subject.

Accordingly, the ability to provide enhanced age progression methods that alleviates the drawbacks associated with previously-proposed methods is an area of interest and continued research for, for instances, establishing commercial advantage in the industry. For instance, it is desirable to be able to age progress the face of a given subject, as provided in an input image that has been collected in situ rather than placing the given subject in a considered and/or specialized context, over a broad age spectrum.

SUMMARY

The shortcomings of the prior art are overcome and additional advantages are provided through the provision of a computer-implemented method of facilitating age progression of a test subject facial image. The computer-implemented method includes: compiling training data and manipulating the training data. The compiled training data includes at least one training set including selected facial images of subjects in a corresponding gender and classified into age groups. Manipulating the training data includes, for a given age-group of a given training set, substantially aligning respective face shapes of subjects; computing a common frame based on the aligned shapes; substantially aligning respective face appearances of subjects, thereby generating a shape-free form corresponding to the face appearance of each subject, using the substantially aligned shapes to generate, in respect of a shape aspect, an age specific shape dictionary for each given age-group, and a common shape dictionary for all the given age groups, of the given training set, in using the substantially aligned appearances to generate, in respect of an appearance aspect, at least an age specific appearance dictionary for each given age group, and a common appearance dictionary for all the given age groups, of the given training set. The age specific appearance dictionary for each given age group, and the common appearance dictionary facilitate age progression of the test subject facial image.

Systems and computer program products related to one or more aspects are also described and claims herein.

Additional features and advantages are realized through the techniques of the present invention. Other embodiments and aspects of the invention are described in details herein and may be considered a part of the claimed invention.

BRIEF DESCRIPTION OF THE DRAWINGS

Reference will now be made, by way of example, to the accompanying drawings, in which.

DETAILED DESCRIPTION

Figure 1:
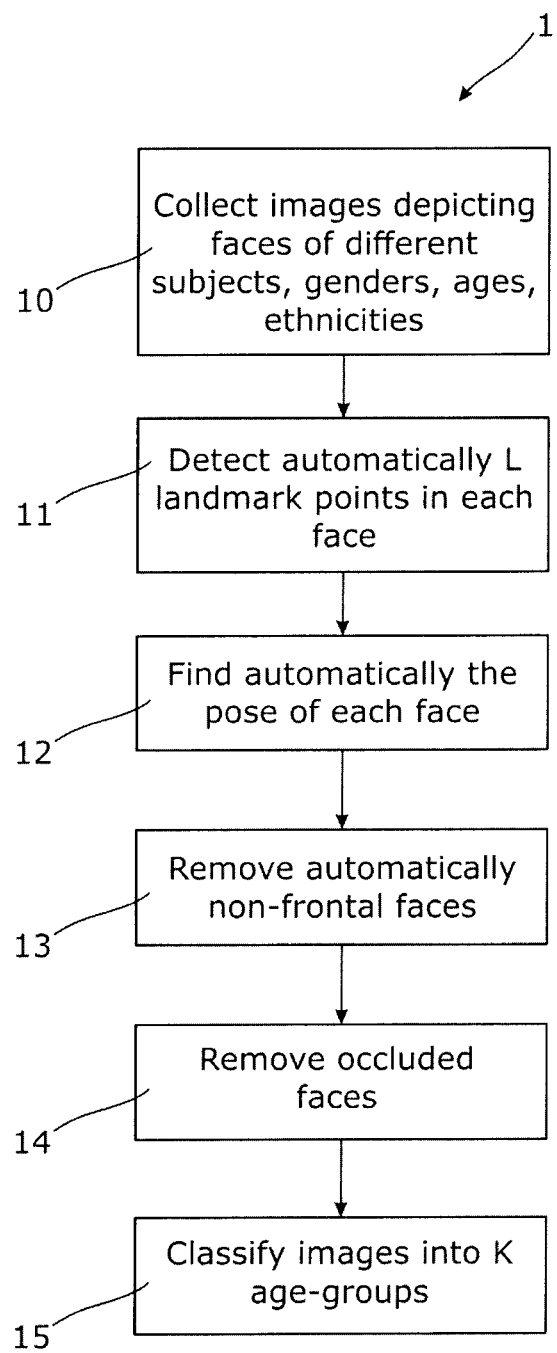
FIG. 1 schematically illustrates a stage of compiling training data, in accordance with one or more aspects of the present invention.

Within the description, the same reference numerals or signs are used to denote the same parts or the like.

An embodiment of the present invention may be applied for age progression of a test subject via respective stages including: compiling training data that is to form a basis of performing age progression; manipulating the training data to at least generate further information to be applied in, and further refine, performance of the age progression, and testing the training data, thereby applying the training data for age progression of the test subject in any given age-group.

Compiling Training Data

Reference is now made to FIG. 1, which schematically illustrates a stage 1 of compiling training data in a computer-implemented embodiment according to an aspect of the present invention.

Compilation of the training data is begun at block 10 by accessing a database D including images of different subjects in different ages, genders and/or ethnicities. Each of the images is taken in situ, that is, without arranging any subject in a given pose and/or taking any image in a specific context and/or condition, for example.

Because it is desirable that an embodiment of the present invention be applicable over a relatively wide-spectrum of ages, an age-range of subjects whose images are accessed from the database D at block 10 may be chosen to be relatively wide too and may, by way of example, be chosen to range from one month to over ninety years.

At block 11, a respective detected face of subjects in each of the accessed images is mapped. This may be done by mapping each detected subject face according to defined landmark coordinates L. By way of example, L may include 68 landmark coordinates in an embodiment of the present invention. Such mapping according to defined landmark coordinates may be performed by passing a bounding box as input into a face localization method. In this way, a corresponding shape s of each detected face may be obtained and may be defined for x, y landmark coordinates as:

$$s=[x_1,y_1,x_2,y_2,\ldots,x_L,y_L] \in R^{2L \times 1}.$$

In an embodiment of the present invention, a selection may be performed of those accessed images that are to form a basis of the training data. In this regard, and according to block 12, a subject pose in respective faces detected from the accessed images is determined. For this purpose, a three-dimensional face shape model is used in conjunction with the predefined landmark coordinates L that are used for face mapping as above-described. From a subject pose, it may be automatically ascertained whether there is a non-frontal aspect in the detected face of the subject. At block 13, removal of those accessed images including subject poses with at least a non-frontal aspect is performed so that such images are not used for compilation of the training data. At block 14, removal of those accessed images with occlusions on the subject face is performed. Non-frontal aspects and occlusions are criteria according to which the accessed images are selected for compilation of the training data in an embodiment of the present invention. However, an embodiment of the present invention is not limited thereto and, indeed other criteria may be introduced for further refinement of such a selection of those accessed images that are to form the basis of the training data.

At block 15, respective training sets are compiled whereby, in respect of a given gender, a training set having selected images of subjects in a corresponding gender, and classified into given age-groups K, is compiled. By way of example, the selected images of subjects that are to form the basis of the training data are classified into K different age-groups, where respective training sets may include N images of males and N images of females for each age-group i of the K different age-groups. The training data in an embodiment of the present invention may include such compiled training sets.

Manipulating the Training Data

Figure 2:
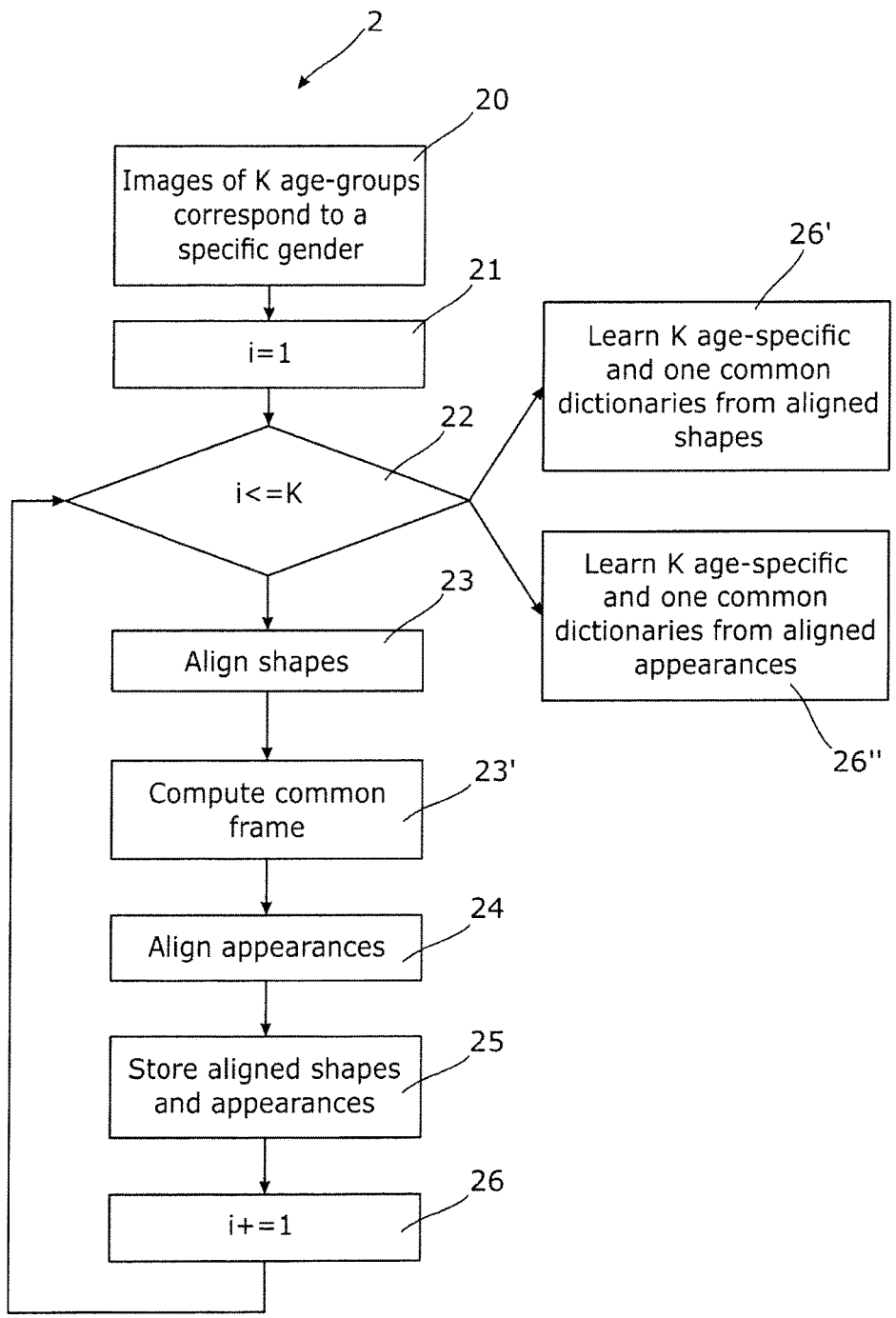
FIG. 2 schematically illustrates a stage of manipulating training data, in accordance with one or more aspects of the present invention.

The training data compiled in stage 1 of an embodiment of the present invention is then manipulated in a further stage 2. So, reference is now made to FIG. 2, which schematically illustrates steps according to the stage 2 of manipulating the training data in an embodiment of the present invention.

In an embodiment of the present invention, each age-group of a given training set is allocated an integer i, which extends from 1 to K integers. At block 20, a given training set comprising selected images of subjects in a given gender and classified into K given age-groups is selected as an input. At block 21, the index allocated to a given age-group i of the given training set is set to i=1.

Generally, the shape of a human face has rigid variations that may be attributed to scale, rotation and translation of the face, for example, and non-rigid variations that may be attributed to the facial expressions pertaining to the face of the subject. So as to improve the accuracy with which age progression of a subject face is performed in different age-groups in an embodiment of the present invention, rigid variations are substantially removed from images in any given training set.

For the condition i≤K at block 22, a step of substantially aligning the respective face shapes of the subjects in the given age-group i is performed at block 23. In an embodiment of the present invention, such an alignment may be performed with Generalised Procrustes Analysis as described in Cootes et. al in the document, "Statistical models of appearance for computer vision", an online technical report of which may be generated using http://www.isbe.man.ac.uk/~bim/refs.html (2001). An embodiment of the present invention is, of course, not limited to the use of such a method to perform such an alignment and, indeed, any other method that may be suitable for performing this task within the context of an embodiment of the present invention may be used. Performance of such alignment in respect of a given age-group i results in rigid variations being substantially removed from respective faces of subjects in that given age-group i; it also facilitates a corresponding mean face shape, hereinafter also referred to as a common frame, to be generated for that given age-group i, this being generally denoted at block 23' in FIG. 2.

Following on to block 24, respective face appearances of subjects in the given age-group i are substantially aligned. This may be done by putting respective detected faces of the subjects substantially into correspondence with respect to each other, by warping them into the common frame correspondingly generated for the given age-group i. In an embodiment of the present invention, such warping may be performed using the Piecewise Affine Warp based on the Delaunay triangulation that is described by Dryden et. al in "Statistical shape analysis", published by Wiley (1998). An embodiment of the present invention is, of course, not limited to the use of such a method to perform such a task and, indeed, any other method that may be suitable within the context of an embodiment of the present invention may be used. In this way, shape-free images are created for respective faces of the subjects in the given age-group i. The shape-free images each have the same dimension $d_i=m_i \times n_i$, where $m_i$ and $n_i$ respectively denote a height and a width of each of the warped images.

Denoted at block 25 is that the aligned respective face shapes of block 23 and shape-free forms generated at block 24 by the alignment of face appearances of subjects in a given age-group i are stored as columns in two given matrices, $X_i^S \in R^{2L \times N}$ and $X_i^A \in R^{d_i \times N}$, where: $X_i^S$ is generated in respect of a shape aspect and $X_i^A$ is generated in respect of an appearance aspect; S includes shape information; A includes appearance information; i is an integer allocated to a given age-group in respect of which a given matrix is formed, and extends from 1 to K integers for a given training set; L is the number of defined landmark coordinates for mapping a detected face, thereby to obtain a corresponding face shape; N is a number of images in each age-group, and $d_i$ includes the dimension of a shape-free form corresponding to the face appearance of each subject.

In an embodiment of the present invention, the face of a subject in a given age-group i of a given training set may be expressed as a superposition of two components: an age component including age-related information pertaining to the given age-group i and a common component generally including information on given facial appearance variations pertaining to all the given age-groups i spanning across the given training set. Regarding facial appearance variations, and by way of example, they may be at least one of expression, shape and identity in an embodiment of the present invention.

For an appearance aspect pertaining to a given training set: an age-component is generated in respect of each given age-group i, and a common component is generated in respect of, and is shared by, all given age-groups i of the given training set. For the appearance aspect: the correspondingly generated age-component for a given age-group i is stored in a given age-specific appearance-dictionary, $D_i^A$, and the correspondingly generated common component is stored in a given common appearance-dictionary, $D_{0,i}^A$. Matrix $X_i^A$ generated at block 25 is used for the generation of these age-specific and common appearance-dictionaries, $D_i^A$, $D_{0,i}^A$.

For a shape aspect pertaining to a given training set: an age-component is generated in respect of each given age-group i, and a common component is generated in respect of, and is shared by, all given age-groups i of the given training set. For the shape aspect: the correspondingly generated age-component for a given age-group i is stored in a given age-specific shape-dictionary, $D_i^S$, and the correspondingly generated common component is stored in a given common shape-dictionary, $D_{0,i}^S$. Matrix $X_i^S$ generated at block 25 is used for the generation of these age-specific and common shape-dictionaries, $D_i^S$, $D_{0,i}^S$.

Given that $\{X_i^S, X_i^A\}_{i=1}^K$, K age-specific dictionaries, $\{D_i^S, D_i^A\}_{i=1}^K$ and one common shape-dictionary $\{D_{0,i}^S, D_{0,i}^A\}$ are generated for respective shape and appearance aspects for a given training set. This is generally denoted by reference numerals 26' and 26'' on FIG. 2 and is done by decomposing the matrices $X_i^S$ and $X_i^A$ into three components according to equation (1) as shown below:

$$X_i^A = D_{0,i}^A + D_i^A + E_i^A \quad i=1,\ldots K \tag{1}$$

$$X_i^S = D_{0,i}^S + D_i^S + E_i^S \quad i=1,\ldots K$$

where: $E_i$, $E_i^A$ include respective error matrices that are applied when generating the respective shape-dictionaries and appearance dictionaries of equation (1). Such error matrices are applied in order to make an embodiment of the present invention relatively robust to different types of errors that may serve to reduce the accuracy with which progression of a test subject image may be performed in different age-groups i. By way of example, such errors may be, but are not limited to, relatively poor localization of the landmark coordinates L during face mapping, the presence of occlusions and/or illuminations in respect of any image of any given training set.

At block 26, an embodiment of the present invention is looped and the steps from block 23 to 25 are performed for a next age-group i+=1 of the given training set, thereby to generate corresponding age-specific and common shape-dictionaries $D_i^S$, $D_{0,i}^S$, and age-specific and common appearance-dictionaries, $D_i^A$, $D_{0,i}^A$, for that next age-group i+=1. Such a loop and perform function may be done until corresponding age-specific and common shape-dictionaries $D_i^S$, $D_{0,i}^S$, and age-specific and common appearance-dictionaries, $D_i^A$, $D_{0,i}^A$, are generated for all the given age-groups i, of the given training set, where i=1, . . . K.

Testing the Training Data

Figure 3:
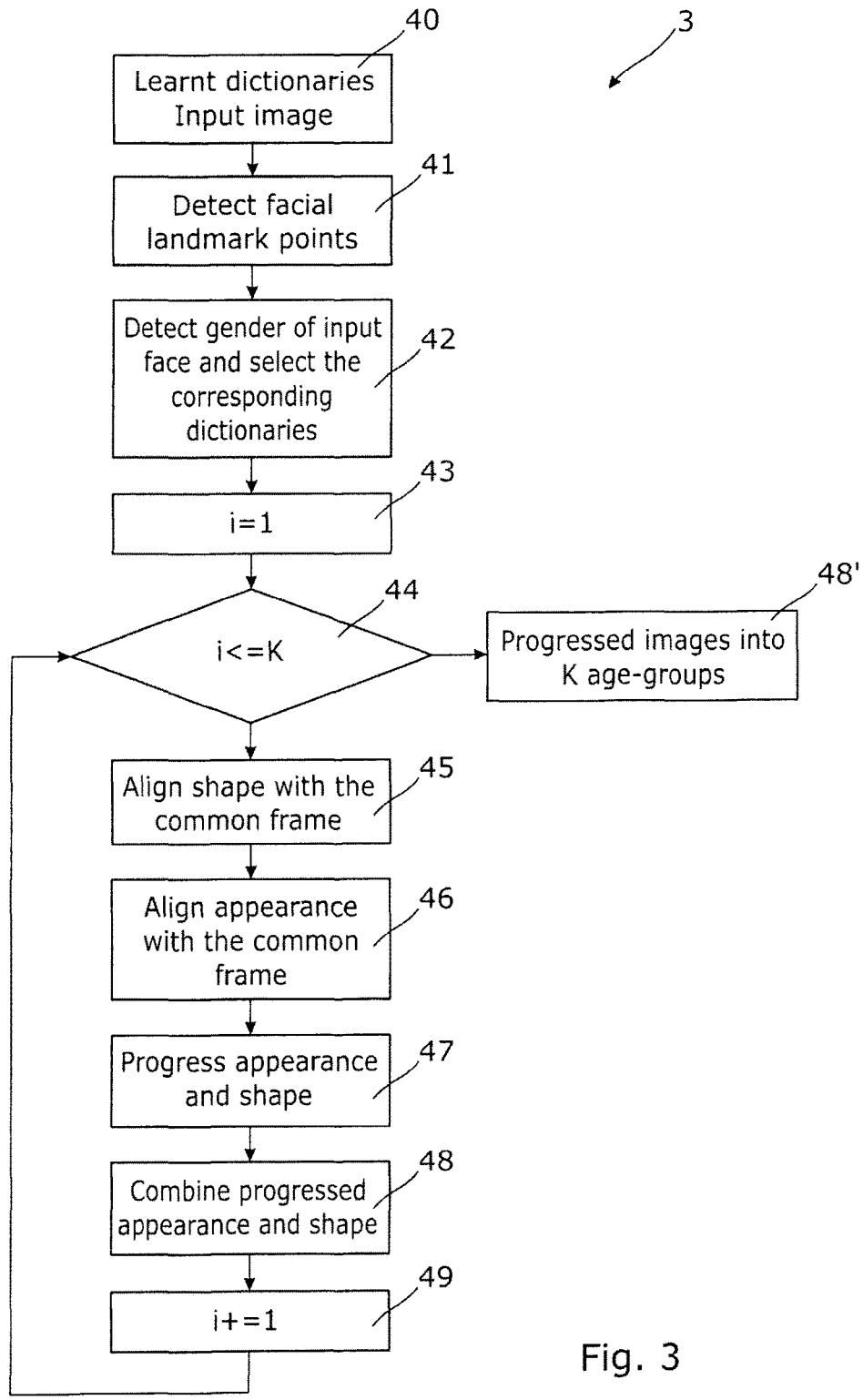
FIG. 3 schematically illustrates a stage of testing training data, in accordance with one or more aspects of the present invention.

Reference is now made to FIG. 3, which schematically illustrates a stage 3 of testing training data in an embodiment according to a method aspect of the present invention.

At block 40, for the input of an image Y of a test subject that is to form the basis of age progression in different age-groups i, respective age-specific and common shape-dictionaries, $D_i^S$, $D_{0,i}^S$, and respective age-specific and common appearance-dictionaries, $D_i^A$, $D_{0,i}^A$, generated for given training sets are called up.

At block 41, the face of the test subject is detected from the image Y and mapped according to the defined landmark coordinates L, thereby to yield a corresponding face shape of the test subject. Such mapping is performed as above-described with reference to block 11 in FIG. 1.

At block 42, at least a given training set compiled in respect of a gender corresponding to the test subject gender is accessed. Respective age-specific and common shape-dictionaries, $D_i^S$, $D_{0,i}^S$, and respective age-specific and common appearance-dictionaries, $D_i^A$, $D_{0,i}^A$, generated for given age-groups i of the accessed training set are also called up.

At block 43, the index allocated to a given age-group i of the accessed training set is set to i=1.

For a condition i≤K being registered at block 44, a step of the test subject face shape being substantially aligned with the common frame computed for such a given age-group i of the given training set is performed at block 45, where i=1, . . . K. Such an alignment may be performed with the Generalised Procrustes Analysis as above-mentioned in the description of manipulation of the training data as performed at block 23 of stage 2 in an embodiment of the present invention. Of course, an embodiment of the present invention is not limited to the use of such a method to perform such an alignment and, indeed, any other method that may be suitable for performing this task within the context of an embodiment of the present invention may be used.

Following on to block 46, the face appearance of the test subject is aligned with the common frame computed for the given age-group i of the given training set as hereinbefore mentioned with respect to block 44. This is done by putting the detected face of the test subject substantially in correspondence with the common frame generated in respect of the given age-group i, by warping it into the common frame. Such warping may be performed using the Piecewise Affine Warp based on the Delaunay triangulation as above-mentioned in the description of manipulation of the training data as performed at block 24 of stage 2 in an embodiment of the present invention. Of course, an embodiment of the present invention is not limited to the use of such a method to perform such a task and, indeed, any other method that may be suitable within the context of an embodiment of the present invention may be used.

At block 47, respective progression of the aligned test subject face shape of block 45 and aligned test subject face appearance of block 46 is performed in the given age-group i of the accessed training set.

At block 47, progression of the aligned test subject face shape in the given age-group i of the accessed training set is performed by generating respective coding parameters $c_{i,2}^S$, $c_{i,1}^S$, for the age-specific shape-dictionary $D_i^S$ and common shape-dictionary $D_{0,i}^S$, which have been generated in respect of that given age-group i, by solving the following equation (2) below:

$$\min_{c_{i,1}^S, c_{i,2}^S} \lambda_c(\|c_{i,1}^S\|_2^2 + \|c_{i,2}^S\|_2^2) + \lambda_e(\|e_i\|_1) \tag{2}$$

subject to the constraint that:

$$y_i^S = D_{0,i}^S c_{i,1}^S + D_i^S c_{i,2}^S + e_i$$

where: S is a shape aspect; i is an integer allocated to a given age-group of the accessed training set and extends from 1 to K integers for the accessed training set; $\lambda_c$ and $\lambda_e$ are respective weighting parameters; $\|\cdot\|_1$, $\|\cdot\|_2$ respectively include the $l_1$ and $l_2$ norms and are respectively defined for a vector x as $\|x\|_1 = \Sigma_i |x_i|$ and $\|x\|_2 = \sqrt{\Sigma_i |x_i|^2}$, $e_i$ are a sparse vector accounting for non-Gaussian sparse errors; $c_{i,1}^S$, $c_{i,2}^S$ are coding parameters for respective allocation to the common shape-dictionary $D_{0,i}^S$ and given age-specific shape-dictionaries $D_i^S$, and $y_i^S$ are the aligned face shape of the test subject into a given common frame computed in respect of a given age-group i of the accessed training set.

At block 47, progression of the aligned test subject face appearance in the given age-group i of the accessed training set is performed by generating respective coding parameters $c_{i,2}^A$, $c_{i,1}^A$, for the age-specific appearance-dictionary $D_i^A$ and common appearance-dictionary $D_{0,i}^A$, which have been generated in respect of that given age-group i, by solving the following equation (3) below:

$$\min_{c_{i,1}^A, c_{i,2}^A} \lambda_c (\|c_{i,1}^A\|_2^2 + \|c_{i,2}^A\|_2^2) + \lambda_e (\|e_i\|_1) \quad (3)$$

subject to the constraint that:

$$y_i^A = D_{0,i}^A c_{i,1}^A + D_i^A c_{i,2}^A + e_i$$

where: A is an appearance aspect; I is an integer allocated to a given age-group of the accessed training set and extends from 1 to K integers for the accessed training set; $\lambda_c$ and $\lambda_e$ are respective weighting parameters; $\|\cdot\|_1$, $\|\cdot\|_2$ respectively comprise are $l_1$ and $l_2$ norms and are respectively defined for a vector x as $\|x\|_1 = \Sigma_i |x_i|$ and $\|x\|_2 = \sqrt{\Sigma_i |x_i|^2}$, $e_i$ is a sparse vector accounting for non-Gaussian sparse errors; $c_{i,1}^A$, $c_{i,2}^A$ are coding parameters for respective allocation to the common appearance-dictionary $D_{0,i}^A$ and given age-specific appearance-dictionaries $D_i^A$, and $y_i^A$ is the aligned face appearance of the test subject into a given common frame computed in respect of a given age-group i of the accessed training set.

It can be seen from equations (2) and (3) that the progressed version of a test subject face includes the summation of: a linear combination of columns of a given age-specific dictionary, $D_i^S$, $D_i^A$, a linear combination of columns of the corresponding common dictionary, $D_{0,i}^S$, $D_{0,i}^A$ and a sparse vector $e_i$ accounting for non-Gaussian sparse errors.

The progressed appearance and the progressed shape of the test subject face in the given age-group i of the accessed training set may be respectively generated in accordance with equation (4) below:

$$\{\text{progressed appearance}\}_i = D_{0,i}^A c_{i,1}^A + D_i^A c_{i,2}^A$$

$$\{\text{progressed shape}\}_i = D_{0,i}^S c_{i,1}^S + D_i^S c_{i,2}^S \quad (4)$$

where: $c_{i,1}^S$, $c_{i,2}^S$ are coding parameters for respective allocation to the common shape-dictionary $D_{0,i}^S$ and given age-specific shape-dictionaries $D_i^S$, and $c_{i,1}^A$, $c_{i,2}^A$ are coding parameters for respective allocation to the common appearance-dictionary $D_{0,i}^A$ and given age-specific appearance-dictionaries $D_i^A$.

At block 48, the progressed appearance and the progressed shape of the test subject as defined in equation (4), which are generated in respect of the given age-group i of the accessed training set, are substantially combined. In an embodiment of the present invention, this may be performed by substantially warping the progressed appearance into the progressed face shape. Such warping may be performed, as above-described, with the Piecewise Affine Warp.

At block 49, an embodiment of the present invention is looped and the steps from block 45 to 48 are performed for a next age-group i+=1 of the given training set, thereby returning progressed images of the test subject for that next age-group i+=1. Such a loop and perform function may be done until progressed images are collected for all of the K age-groups of the given training set and they are returned/stored, this being denoted at block 48'.

Note from the above description that provided herein, in one or aspects, is a computer-implemented method of facilitated age progression of a test subject facial image. The computer-implemented method includes: compiling training data, the training data including at least one training set including selected images of subjects in a corresponding gender in classified into given age groups; and manipulating the training data. Manipulating the training data includes: for a given age group of a given training set, substantially aligning respective face shapes of the subjects; computing a common frame based on the aligned shapes; substantially aligning respective face appearances of subjects, thereby generating a shape-free form corresponding to the face appearance of each subject, using the substantially aligned shapes to generate, in respect of a shape aspect, in age specific shape dictionary for each given age group, and a common shape dictionary for all the given age groups, of the given training set, and using the substantially aligned appearances to generate, in respect of an appearance aspect, at least an age specific appearance dictionary for each given age group, and a common appearance dictionary for all the given age groups, of the given training set. Together the age specific appearance dictionary for each given age group, and the common appearance dictionary facilitate age progression of the test subject facial image.

In one or more implementations, compiling the training data may include: accessing images of different subjects; mapping a respective detected face in each of the accessed images according to defined landmark coordinates and obtaining a face shape corresponding to each detected face; selecting accessed images according to at least a given criterion, and compiling, in respect of a given gender, the at least one training set.

In or more embodiments, the computer-implemented method may further include testing the training data. The testing may include: accessing at least a training set substantially corresponding in gender to a detected gender of the test subject; accessing given age specific dictionaries and common dictionaries, which have been generated for respective shape and appearance aspects, in respect of the given age groups of the accessed training set; mapping a detected face of the test subject according to the defined landmark coordinates to obtain a corresponding test subject face shape; substantially aligning the test subject face shape with a common frame respectively computed for each given age group of the accessed training set; substantially aligning at least a face appearance of the test subject with the respective common frame computed in respect to each given age group of the accessed training set; progressing the aligned test subject face shape in at least a selectable age group of the accessed training set using a corresponding age specific shape dictionary and common shape dictionary; progressing the aligned test subject face appearance in at least the selected age group of the accessed training set using a corresponding age specific appearance dictionary and common appearance dictionary, in substantially combing at least a progressed face shape and progressed face appearance of the test subject in the selective age group of the accessed training set.

Aligning an appearance of a given subject into a given common frame may be performed by substantially warping the detected face of the subject into the given common frame. In this way, alignment of an appearance of a given subject into a given common frame may be performed without the need for use and/or development of relatively complex processing resources. This feature may extend the advantages of ease of use and relatively efficient allocation of processing resources to an embodiment of the present invention.

Manipulating the training data may further include generating for a given training set, at least an age-specific dictionary for a given age-group and common dictionary for all given age-groups, in respect of each of a shape aspect and an appearance aspect, by applying a corresponding error aspect. In an embodiment of the present invention, error aspects are applied in the generation of the given age-specific dictionaries and common dictionaries. This may serve to make an embodiment of the present invention relatively robust to different types of errors that may serve to reduce the accuracy with which progression of a test subject image may be performed in different age-groups. By way of example, such errors may be, but are not limited to, relatively poor localization of the landmark coordinates during face mapping, the presence of occlusions and/or illuminations in respect of any image of any given training set.

More particularly, manipulating the training data may include generating at least two matrices, $X_i^S \in R^{2L \times N}$ and $X_i^A \in R^{d_i \times N}$ for respective shape and appearance aspects by using the aligned respective face shapes and aligned face appearances of subjects, where: S includes shape information; A includes appearance information; i is an integer allocated to a given age-group in respect of which a given matrix is formed, and extends from 1 to K integers for a given training set; L is the number of defined landmark coordinates for mapping a detected face, thereby to obtain a corresponding face shape; N is a number of images in each age-group, and $d_i$ is a dimension of a shape-free form corresponding to the face appearance of each subject, and performing a decomposition of the matrices $X_i^S$ and $X_i^A$, respective to a shape aspect and appearance aspect, into at least three components so as to correspondingly generate, in respect of each aspect, at least an age-specific dictionary for each given age-group, and a common dictionary for all the given age-groups, of a given training set:

$$X_i^A = D_{0,i}^A + D_i^A + E_i^A \quad i=1, \ldots K$$

$$X_i^S = D_{0,i}^S + D_i^S + E_i^S \quad i=1, \ldots K$$

where: $D_{0,i}^A$, $D_i^A$, respectively are a common appearance-dictionary and a given age-specific appearance-dictionary that are generated in respect of an appearance aspect A for the given training set, $D_{0,i}^S$, $D_i^S$, respectively are a common shape-dictionary and a given age-specific shape-dictionary that are generated in respect of a shape aspect S for the given training set, and $E_i^S$, $E_i^A$ are error matrices generated respectively for the shape aspect S and appearance aspect A. In an embodiment of the present invention, given age-specific dictionaries and common dictionaries are generated in respect of one of a shape aspect or an appearance aspect by performing a decomposition of corresponding matrices generated in respect of any one of these aspects. This feature extends the advantage of relative ease of generation of the training data forming a basis of age progression to an embodiment of the present invention.

Testing the training data may include: progressing the test subject face and face appearance in a given age-group of the accessed training set by solving a respective coding problem for each of a shape aspect and an appearance aspect in respect of the given age-group. A given optimization problem may be solved in order to respectively progress the face shape and face appearance of a given test subject in an embodiment of the present invention. This may extend the advantages of increased efficiency and reduced complexity with which age progression may be performed in an embodiment of the present invention.

More particularly, testing the training data may include progressing the aligned test subject face shape in a given age-group of the accessed training set by generating respective coding parameters for the age-specific shape-dictionary and common shape-dictionary, which have been generated in respect of the given age-group, by solving:

$$\min_{c_{i,1}^S, c_{i,2}^S} \lambda_c(\|c_{i,1}^S\|_2^2 + \|c_{i,2}^S\|_2^2) + \lambda_e(\|e_i\|_1)$$

subject to the constraint that:

$$y_i^S = D_{0,i}^S c_{i,1}^S + D_i^S c_{i,2}^S + e_i$$

where: S is a shape aspect; i is an integer allocated to a given age-group of the accessed training set and extends from 1 to K integers for the accessed training set; $\lambda_c$ and $\lambda_e$ are respective weighting parameters; $\|\cdot\|_1$, $\|\cdot\|_2$ respectively are the $l_1$ and $l_2$ norms and are respectively defined for a vector x as $\|x\|_1 = \Sigma_i |x_i|$ and $\|x\|_2 = \sqrt{\Sigma_i |x_i|^2}$, $e_i$ are a sparse vector accounting for non-Gaussian sparse errors; $c_{i,1}^S$, $c_{i,2}^S$ are coding parameters for respective allocation to the common shape-dictionary $D_{0,i}^S$ and given age-specific shape-dictionaries $D_i^S$, and $y_i^S$ are the aligned face shape of the test subject into a given common frame computed in respect of a given age-group i of the accessed training set. The progressed face shape of the test subject may be generated on the basis of a summation of: a linear combination of columns of a given age-specific shape dictionary, $D_i^S$, a linear combination of columns of the corresponding common shape dictionary, $D_{0,i}^S$, and a sparse vector $e_i$ accounting for non-Gaussian sparse errors. This feature may extend the advantages of ease of age progression of a given test subject in a given age-group since such summation may be performed with relative ease and by using relatively fewer technical and/or processing resources.

In one or more implementations, testing the training data may include progressing the aligned test subject face appearance in a given age-group of the accessed training set by generating respective coding parameters for the age-specific appearance-dictionary and common appearance-dictionary, which have been generated in respect of the given age-group, by solving:

$$\min_{c_{i,1}^A, c_{i,2}^A} \lambda_c(\|c_{i,1}^A\|_2^2 + \|c_{i,2}^A\|_2^2) + \lambda_e(\|e_i\|_1)$$

subject to the constraint that:

$$y_i^A = D_{0,i}^A c_{i,1}^A + D_i^A c_{i,2}^A + e_i$$

where: A is an appearance aspect; i is an integer allocated to a given age-group of the accessed training set and extends from 1 to K integers for the accessed training set; $\lambda_c$ and $\lambda_e$ are respective weighting parameters; $\|\cdot\|_1$, $\|\cdot\|_2$ respectively are the $l_1$ and $l_2$ norms and are respectively defined for a vector x as $\|x\|_1 = \Sigma_i |x_i|$ and $\|x\|_2 = \sqrt{\Sigma_i |x_i|^2}$, $e_i$ are a sparse vector accounting for non-Gaussian sparse errors; $c_{i,1}{}^A$, $c_{i,2}{}^A$ are coding parameters for respective allocation to the common appearance-dictionary $D_{0,i}{}^A$ and given age-specific appearance-dictionaries $D_i{}^A$, and $y_i{}^A$ are the aligned face appearance of the test subject into a given common frame computed in respect of a given age-group i of the accessed training set. The progressed face appearance of the test subject is generated on a basis of the summation of: a linear combination of columns of a given age-specific appearance dictionary, $D_i{}^A$, a linear combination of columns of the corresponding common appearance dictionary, $D_{0,i}{}^A$, and a sparse vector $e_i$ accounting for non-Gaussian sparse errors. This feature may extend the advantages of ease of age progression of a given test subject in a given age-group since such summation may be performed with relative ease and by using relatively fewer technical and/or processing resources.

In one or more embodiments, the age-specific dictionary generated for an age-group of a given training set may include age-related information of subjects in that age-group. An age-specific dictionary may be compiled for each given age-group in each given training set in an embodiment of the present invention. Because such age-specific dictionaries are compiled using age-related information on multiple, different subjects possessing a variety of age-related characteristics, the advantages of improved accuracy and versatility may be extended to an embodiment of the present invention since age progression of a test subject is performed using such age-specific dictionaries.

In one or more embodiments, the common dictionary generated in respect of a given training set may include information on at least a given facial appearance variation of subjects in all the age-groups of that given training set. In an embodiment of the present invention, a common dictionary is compiled in respect of each training set, for all given age-groups thereof. The common dictionaries are compiled using facial appearance variations recorded for multiple, different subjects. Such common dictionaries form a basis of age progression being performed in respect of a given test subject in an embodiment of the present invention. Thus, this feature may further reinforce the advantages of improved accuracy and versatility with which age progression is performed in an embodiment of the present invention.

In one or more implementations, testing the training data includes: respectively generating the progressed face appearance and the progressed face shape of the test subject in a given age-group of the accessed training set as:

$$\{\text{progressed appearance}\}_i = D_{0,i}{}^A c_{i,1}{}^A + D_i{}^A c_{i,2}{}^A$$

$$\{\text{progressed shape}\}_i = D_{0,i}{}^S c_{i,1}{}^S + D_i{}^S c_{i,2}{}^S$$

where: A and S are respective appearance and shape aspects, i is an integer allocated to a given age-group of the accessed training set and extends from 1 to K integers, $D_{0,i}{}^S$ is the common shape-dictionary generated in respect of any given age-group i of the accessed training set; $D_i{}^S$ is a given age-specific shape-dictionary generated in respect of a given age-group i of the accessed training set; $c_{i,1}{}^S$, $c_{i,2}{}^S$ are coding parameters for respective allocation to the common shape-dictionary $D_{0,i}{}^S$ and given age-specific shape-dictionaries $D_i{}^S$; $D_{0,i}{}^A$ are the common appearance-dictionary generated in respect of any given age-group i of the accessed training set; $D_i{}^A$ is a given age-specific appearance-dictionary generated in respect of a given age-group i of the accessed training set, and $c_{i,1}{}^A$, $c_{i,2}{}^A$ are coding parameters for respective allocation to the common appearance-dictionary $D_{0,i}{}^A$ and given age-specific appearance-dictionaries $D_i{}^A$. The progressed face appearance and the progressed face shape of the test subject are respectively generated in an embodiment of the present invention. This presents the opportunity for individual analysis of the respective progressions, which may be desirable in certain scenarios. Such individual analysis may include, for example, further processing of either or both of the respective progressions and/or viewing the corresponding visual depictions of the respective progressions. This feature may serve to extend the advantages of versatility and ease of use to an embodiment of the present invention.

Testing the training data may also include: substantially combining the progressed face shape and the progressed face appearance of the test subject in a selected age-group of the accessed training set by substantially warping the progressed face appearance into the progressed face shape. Information on the facial ageing of a subject pertains to a combination which includes the face shape and face appearance of the subject rather than individual consideration of these features. In an embodiment of the present invention, a combination of the progressed face shape and the progressed face appearance as obtained for a test subject in a selected age-group is performed. An advantage associated with this feature is that relatively accurate and realistic information may be obtained on an expected age progression of the test subject. Also, the corresponding visual depiction of the combined progressed face shape and the progressed face appearance provides ease of view of the expected age progression of the subject.

In one or more embodiments, compiling the training data may include determining a pose of a given subject from a corresponding mapped face of the subject. Age progression according to an embodiment of the present invention may be performed on the basis of training data which includes a collection of multiple images of subjects of different ages, genders, ethnicities, and so forth, which are accessed from a database. So that age progression may be performed with increased accuracy and/or efficiency, selected images from the images accessed from the database are used. Such a selection is performed according to given criteria of such accessed images. Whether an accessed image fulfils such given criteria may be determined from the pose of the subject of that image, which is accordingly determined in an embodiment of the present invention.

Further, in one or more implementations, compiling the training data includes performing a selection of the accessed images by removing those accessed images, including at least a non-frontal aspect and at least an occlusion. Age progression according to an embodiment of the present invention may be performed on the basis of training data comprising a collection of multiple images of subjects of different ages, genders, ethnicities, and so forth, which are accessed from a database. So that age progression may be performed with increased accuracy and/or efficiency, selected images fulfilling given criteria are used from the images accessed from the database. Such given criteria include a lack of a non-frontal face aspect and an occlusion. In this way, the accuracy and efficiency with which age progression is performed in an embodiment of the present invention is further improved.

The present invention has been described purely by way of example and modifications of detail may be made within the scope of the invention.

Exemplary embodiments of computing environments to implement one or more aspects of the present invention are described below with reference to FIGS. 4-6.

Figure 4:
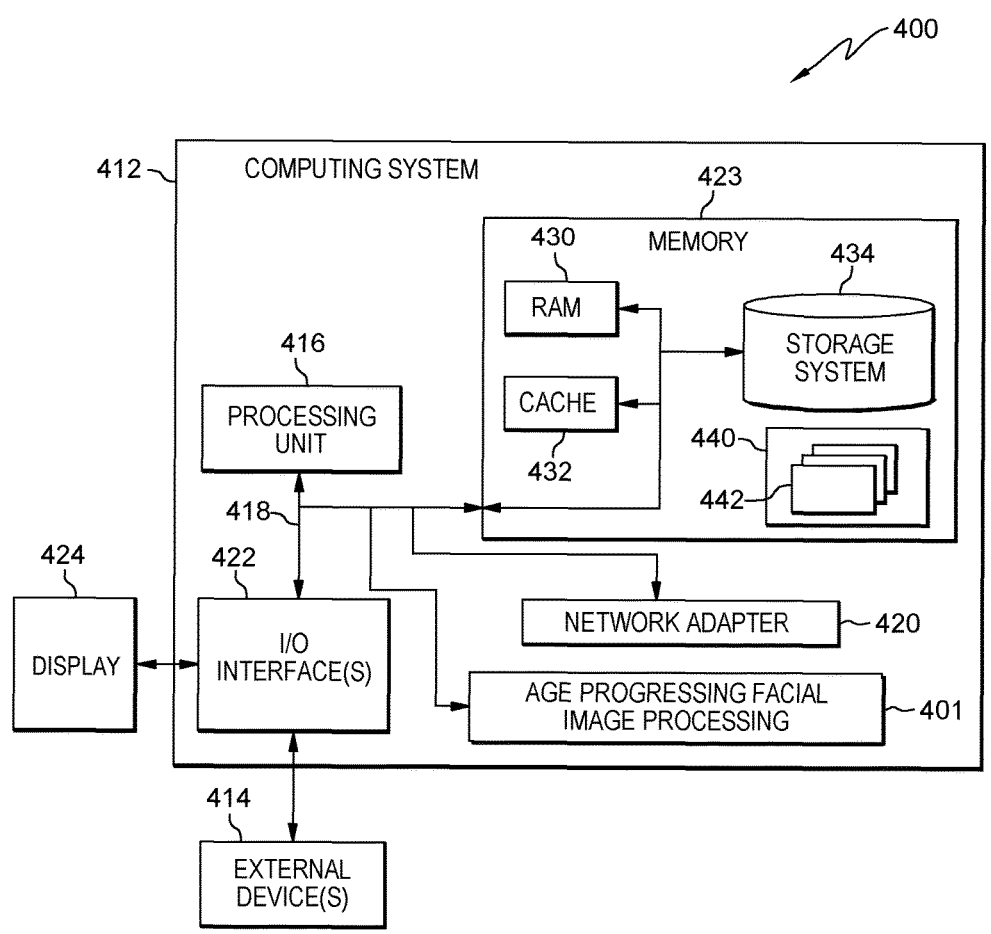
FIG. 4 is blocked diagram of a data processing system in which age progressing facial image progressing may be implemented, in accordance with one or more aspects of the present invention.

By way of further example, FIG. 4 depicts one embodiment of a computing environment 400, which includes a computing system 412. Examples of well-known computing systems, environments, and/or configurations that may be suitable for use with computer system 412 include, but are not limited to, a personal computer, a workstation, a handheld or laptop computer or device, a mobile phone, a programmable consumer electronic device, a tablet, a personal digital assistant (PDA), and the like.

Computing system 412 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 4, computing system 412, is shown in the form of a general-purpose computing device. The components of computing system 412 may include, but are not limited to, one or more processors or processing units 416, a system memory 423, and a bus 418 that couples various system components including system memory 423 to processor 416.

In one embodiment, processor 416 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 412 may include a variety of computer system readable media. Such media may be any available media that is accessible by computing system 412, and it includes both volatile and non-volatile media, removable and non-removable media.

System memory 423 can include computer system readable media in the form of volatile memory, such as random access memory (RAM) 430 and/or cache memory 432. Computing system 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 418 by one or more data media interfaces. As described below, memory 423 may include at least one program product having a set (e.g., at least one) of program modules that are configured to carry out the functions of embodiments of the invention.

Program/utility 440, having a set (at least one) of program modules 442, may be stored in memory 432 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. Alternatively, a separate, processing unit reassignment system, module, logic, etc., 401 may be provided within computing environment 412.

Computing system 412 may also communicate with one or more external devices 414 such as a keyboard, a pointing device, a display 424, etc.; one or more devices that enable a user to interact with computing system 412; and/or any devices (e.g., network card, modem, etc.) that enable computing system 412 to communicate with one or more other computing devices. Such communication can occur via Input/Output (I/O) interfaces 422. Still yet, computing system 412 can communicate with one or more networks such as a local area network (LAN), a general wide area network (WAN), and/or a public network (e.g., the Internet) via network adapter 420. As depicted, network adapter 420 communicates with the other components of computing system, 412, via bus 418. It should be understood that although not shown, other hardware and/or software components could be used in conjunction with computing system 412. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 4. Computer system/server 412 of FIG. 4 may be practiced in distributed cloud computing environments where tasks are performed by remote processing devices that are linked through a communications network. In a distributed cloud computing environment, program modules may be located in both local and remote computer system storage media including memory storage devices. Computer system/server 412 is capable of being implemented and/or performing any of the functionality set forth hereinabove.

Figure 5:
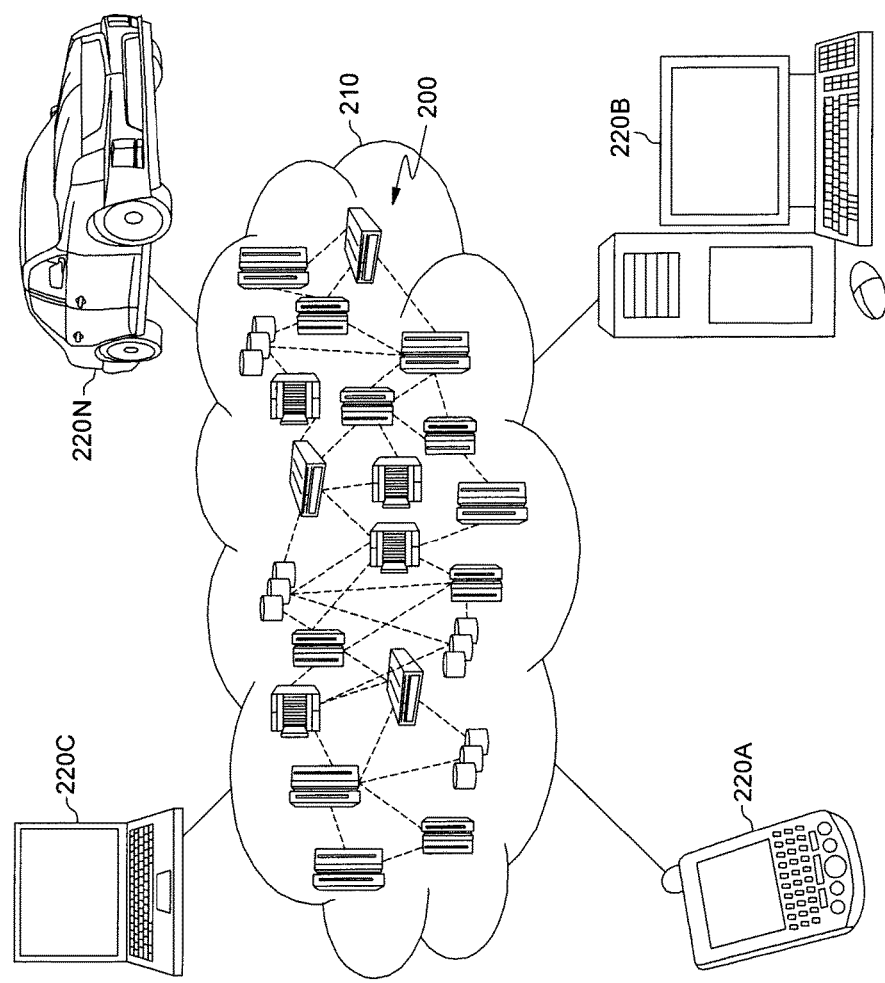
FIG. 5 depicts one embodiment of a cloud computing environment, which may implement, or which may used in associated with one or more aspects of present invention.

Referring now to FIG. 5, illustrative cloud computing environment 210 is depicted. As shown, cloud computing environment 210 comprises one or more cloud computing nodes 200 with which local computing devices used by cloud consumers, such as, for example, personal digital assistant (PDA) or cellular telephone 220A, desktop computer 220B, laptop computer 220C, and/or automobile computer system 220N may communicate. Nodes 200 may communicate with one another. They may be grouped (not shown) physically or virtually, in one or more networks, such as Private, Community, Public, or Hybrid clouds as described hereinabove, or a combination thereof. This allows cloud computing environment 210 to offer infrastructure, platforms and/or software as services for which a cloud consumer does not need to maintain resources on a local computing device. It is understood that the types of computing devices 220A-N shown in FIG. 5 are intended to be illustrative only and that computing nodes 200 and cloud computing environment 210 can communicate with any type of computerized device over any type of network and/or network addressable connection (e.g., using a web browser).

Figure 6:
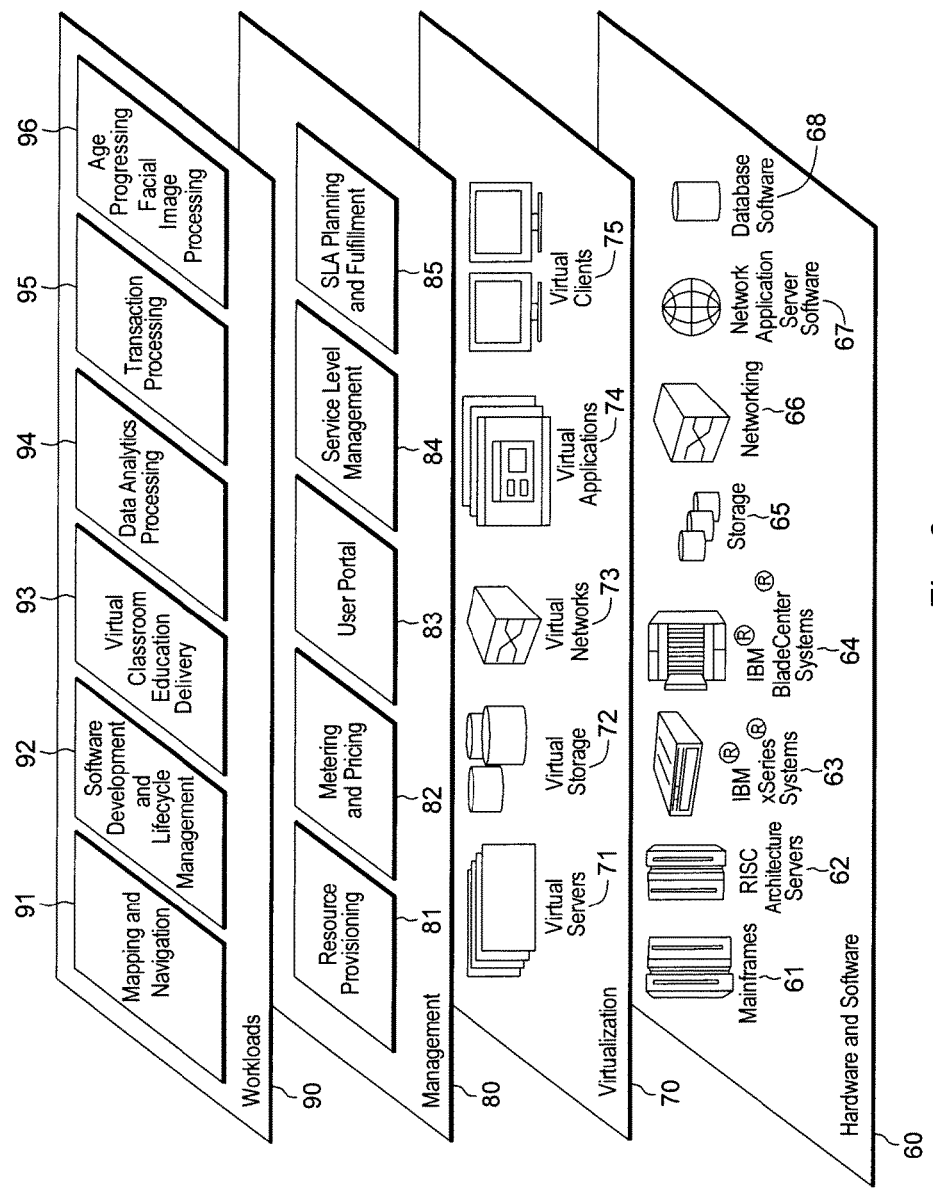
FIG. 6 depicts one embodiment of extraction model layers, which may facilitate or implement one or more aspects of age progressing facial image processing, in accordance with one or more aspects of present invention.

Referring to FIG. 6, a set of functional abstraction layers provided by cloud computing environment 210 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and age progressing facial image processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method of facilitating age progression of a test subject facial image, the computer-implemented method comprising:

compiling training data, the training data comprising at least one training set including selected facial images of subjects in a corresponding gender and classified into given age-groups;

manipulating the training data, comprising, for a given age-group of a given training set, aligning respective face shapes of subjects; computing a common frame based on the aligned respective face shapes; aligning respective face appearances of subjects, thereby generating a shape-free form corresponding to the respective face appearance of each subject, using the aligned respective face shapes to generate, in respect of a shape aspect, an age-specific shape-dictionary for each given age-group, and a common shape-dictionary for all the given age-groups, of the given training set, and using the aligned respective face appearances to generate, in respect of an appearance aspect, at least an age-specific appearance-dictionary for each given age-group, and a common appearance-dictionary for all the given age-groups, of the given training set;

wherein the age-specific appearance-dictionary for each given age-group and the common appearance-dictionary facilitate age progression of the test subject facial image;

wherein compiling training data comprises: accessing images of different subjects;

mapping a respective detected face in each of the accessed images according to defined landmark coordinates and obtaining a face shape corresponding to each of the respective detected face;

selecting the accessed images according to at least a given criterion, and compiling, in respect of a given gender, at least one training set;

the computer-implemented method further comprises testing the training data, the testing comprising: accessing a training set corresponding in gender to a detected gender of the test subject;

accessing given age-specific dictionaries and common dictionaries, which have been generated for respective shape and appearance aspects, in respect of the given age-groups of the accessed training set;

mapping a detected face of the test subject according to the defined landmark coordinates to obtain a test subject face shape;

aligning the test subject face shape with a common frame respectively computed for each given age-group of the accessed training set;

progressing the aligned test subject face shape in at least a selected age-group of the accessed training set using a corresponding age-specific shape-dictionary and common shape dictionary;

aligning a test subject face appearance with a common frame respectively computed for each given age-group of the accessed training set;

progressing the aligned test subject face appearance in at least the selected age-group of the accessed training set using a corresponding age-specific appearance-dictionary and common appearance dictionary, and combing the progressed aligned face shape and the progressed aligned face appearance of the test subject in at least the selected age-group of the accessed training set; and wherein the testing the training data further comprises:
progressing the aligned test subject face shape in a given age-group of the accessed training set by generating respective coding parameters for the age-specific shape-dictionary and the common shape-dictionary, which have been generated in respect of the given age-group, by solving:

subject to the constraint that:

$$y_i^S = D_{0,i}^S c_{i,1}^S + D_i^S c_{i,2}^S + e_i$$

where: S comprises a shape aspect; i comprises an integer allocated to a given age-group of the accessed training set and extends from 1 to K integers for the accessed training set; $\lambda_c$ and $\lambda_e$ comprise respective weighting parameters; $\|\cdot\|_1$, $\|\cdot\|_2$ respectively comprise the $l_1$ and $l_2$ norms and are respectively defined for a vector x as $\|x\|_1 = \Sigma_i |x_i|$ and $\|x\|_2 = \sqrt{\Sigma_i |x_i|^2}$, $e_i$ comprises a sparse vector accounting for non-Gaussian sparse errors; $c_{i,1}^S$, $c_{i,2}^S$ comprise coding parameters for respective allocation to the common shape-dictionary $D_{0,i}^S$ and given age-specific shape-dictionaries $D_i^S$ and $y_i^S$ comprises the aligned face shape of the test subject into a given common frame computed in respect of a given age-group i of the accessed training set.

2. The computer-implemented method of claim 1, wherein aligning an appearance of a given subject into a given common frame is performed by warping the detected face of the given subject into the given common frame.

3. The computer-implemented method of claim 1, wherein the testing the training data further comprises: progressing the aligned test subject face appearance in a given age-group of the accessed training set by generating respective coding parameters for the age-specific appearance-dictionary and the common appearance-dictionary, which have been generated in respect of the given age-group, by solving:

$$\min_{c_{i,1}^A, c_{i,2}^A} \lambda_c (\|c_{i,1}^A\|_2^2 + \|c_{i,2}^A\|_2^2) + \lambda_e(\|e_i\|_1)$$

subject to the constraint that:

$$y_i^A = D_{0,i}^A c_{i,1}^A + D_i^A c_{i,2}^A + e_i$$

where: A comprises an appearance aspect; i comprises an integer allocated to a given age-group of the accessed training set and extends from 1 to K integers for the accessed training set; $\lambda_c$ and $\lambda_e$ comprise respective weighting parameters; $\|\cdot\|_1$, $\|\cdot\|_2$ respectively comprise the $l_1$ and $l_2$ norms and are respectively defined for a vector x as $\|x\|_1 = \Sigma_i |x_i|$ and $\|x\|_2 = \sqrt{\Sigma_i |x_i|^2}$, $e_i$ comprises a sparse vector accounting for non-Gaussian sparse errors; $c_{i,1}^A$, $c_{i,2}^A$ comprise coding parameters for respective allocation to the common appearance—dictionary $D_{0,i}^A$ and given age-specific appearance-dictionaries $D_i^A$, and $y_i^A$ comprises the aligned face appearance of the test subject into the given common frame computed in respect of a given age-group i of the accessed training set.

4. The computer-implemented method of claim 1, wherein the testing the training data further comprises: combining the progressed aligned face shape and the aligned progressed face appearance of the test subject in the selected age-group of the accessed training set by warping the aligned progressed face appearance into the aligned progressed face shape.

5. The computer-implemented method of claim 1, wherein the manipulating the training data, comprises generating for a given training set, at least an age-specific dictionary for a given age-group and a common dictionary for all given age-groups, in respect of each of the shape aspect and the appearance aspect, by applying a corresponding error aspect.

6. The computer-implemented method of claim 1, wherein the manipulating the training data comprises:
generating at least two matrices, $X_i^S \in R^{2L \times N}$ and $X_i^A \in R^{d_i \times N}$ for respective shape and appearance aspects by using the aligned respective face shapes and the aligned respective face appearances of subjects, where:

S comprises shape information; A comprises appearance information;

i comprises an integer allocated to a given age-group in respect of which a given matrix is formed, and extends from 1 to K integers for a given training set;

L comprises the number of defined landmark coordinates for mapping a detected face, thereby to obtain a corresponding face shape;

N comprises a number of images in each age-group, and $d_i$ comprises a dimension of a shape-free form corresponding to the face appearance of each subject, and performing a decomposition of the matrices $X_i^S$ and $X_i^A$, respective to a shape aspect and an appearance aspect, into at least three components so as to correspondingly generate, in respect of each aspect, at least an age-specific dictionary for each given age-group, and a common dictionary for all the given age-groups, of a given training set:

$$X_i^A = +D_{0,i}^A + D_i^A + E_i^A \quad i=1, \ldots K$$

$$X_i^S = D_{0,i}^S + D_i^S + E_i^S \quad i=1, \ldots K$$

where: $D_{0,i}^A$, $D_i^A$, respectively comprise a common appearance-dictionary and a given age-specific appearance-dictionary that are generated in respect of an appearance aspect A for the given training set, $D_{0,i}^S$, $D_i^S$, respectively comprise a common shape-dictionary and a given age-specific shape-dictionary that are generated in respect of a shape aspect S for the given training set, and $E_i^S$, $E_i^A$ comprise error matrices generated respectively for the shape aspect S and appearance aspect A.

7. The computer-implemented method of claim 1, wherein in the manipulating the training data: an age-specific dictionary generated for an age-group of a given training set comprises age-related information of subjects in that age-group.

8. The computer-implemented method of claim 1, wherein the manipulating the training data: a common dictionary generated in respect of a given training set comprises information on at least a given facial appearance variation of subjects in all the age-groups of that given training set.

9. The computer-implemented method of claim 1, wherein the compiling the training data comprises determining a pose of a given subject from a corresponding mapped face of the subject.

10. The computer-implemented method of claim 1, wherein the compiling the training data, comprises performing a selection of the accessed images by removing those accessed images comprising at least a non-frontal aspect and at least an occlusion.

11. A system comprising:
a memory;
and one or more processors communicatively coupled with the memory, wherein the system performs a method of facilitating age progression of a test subject facial image, the method comprising:
compiling training data, the training data comprising at least one training set including selected facial images of subjects in a corresponding gender and classified into given age-groups;
manipulating the training data, comprising, for a given age-group of a given training set, aligning respective face shapes of subjects; computing a common frame based on the aligned respective face shapes; aligning respective face appearances of subjects, thereby generating a shape-free form corresponding to the respective face appearance of each subject, using the aligned respective face shapes to generate, in respect of a shape aspect, an age-specific shape-dictionary for each given age-group, and a common shape-dictionary for all the given age-groups, of the given training set, and using the aligned respective face appearances to generate, in respect of an appearance aspect, at least an age-specific appearance-dictionary for each given age-group, and a common appearance-dictionary for all the given age-groups, of the given training set;
wherein the age-specific appearance-dictionary for each given age-group and the common appearance-dictionary facilitate age progression of the test subject facial image;
wherein compiling training data comprises: accessing images of different subjects;
mapping a respective detected face in each of the accessed images according to defined landmark coordinates and obtaining a face shape corresponding to each of the respective detected face;
selecting the accessed images according to at least a given criterion, and compiling, in respect of a given gender, at least one training set;
the computer-implemented method further comprises testing the training data, the testing comprising: accessing a training set corresponding in gender to a detected gender of the test subject;
accessing given age-specific dictionaries and common dictionaries, which have been generated for respective shape and appearance aspects, in respect of the given age-groups of the accessed training set;
mapping a detected face of the test subject according to the defined landmark coordinates to obtain a test subject face shape;
aligning the test subject face shape with a common frame respectively computed for each given age-group of the accessed training set;
progressing the aligned test subject face shape in at least a selected age-group of the accessed training set using a corresponding age-specific shape-dictionary and common shape dictionary;
aligning a test subject face appearance with a common frame respectively computed for each given age-group of the accessed training set;
progressing the aligned test subject face appearance in at least the selected age-group of the accessed training set using a corresponding age-specific appearance-dictionary and common appearance dictionary, and combing the progressed aligned face shape and the progressed aligned face appearance of the test subject in at least the selected age-group of the accessed training set; and
wherein the testing the training data further comprises: progressing the aligned test subject face shape in a given age-group of the accessed training set by generating respective coding parameters for the age-specific shape-dictionary and the common shape-dictionary, which have been generated in respect of the given age-group, by solving:
subject to the constraint that:

$$y_i^S = D_{0,i}^S c_{i,1}^S + D_i^S c_{i,2}^S + e_i$$

where: S comprises a shape aspect; i comprises an integer allocated to a given age-group of the accessed training set and extends from 1 to K integers for the accessed training set; $\lambda_c$ and $\lambda_e$ comprise respective weighting parameters; $\|\bullet\|_1$, $\|\bullet\|_2$ respectively comprise the $l_1$ and $l_2$ norms and are respectively defined for a vector x as $\|x\|_1 = \Sigma_i |x_i|$ and $\|x\|_2 = \sqrt{\Sigma_i |x_i|^2}$, $e_i$ comprises a sparse vector accounting for non-Gaussian sparse errors; $c_{i,1}^S$, $c_{i,2}^S$ comprise coding parameters for respective allocation to the common shape-dictionary $D_{0,i}^S$ and given age-specific shape-dictionaries $D_i^S$, and $y_i^S$ comprises the aligned face shape of the test subject into a given common frame computed in respect of a given age-group i of the accessed training set.

12. A computer program product for facilitating age progression of a test subject facial image, the computer program product comprising:
a non-transitory computer readable storage medium readable by a processing circuit and storing instructions for execution by the processing circuit for performing a method comprising:
compiling training data, the training data comprising at least one training set including selected facial images of subjects in a corresponding gender and classified into given age-groups;
manipulating the training data, comprising, for a given age-group of a given training set, aligning respective face shapes of subjects; computing a common frame based on the aligned respective face shapes; aligning respective face appearances of subjects, thereby generating a shape-free form corresponding to the respective face appearance of each subject, using the aligned respective face shapes to generate, in respect of a shape aspect, an age-specific shape-dictionary for each given age-group, and a common shape-dictionary for all the given age-groups, of the given training set, and using the aligned respective face appearances to generate, in respect of an appearance aspect, at least an age-specific appearance-dictionary for each given age-group, and a common appearance-dictionary for all the given age-groups, of the given training set;

wherein the age-specific appearance-dictionary for each given age-group and the common appearance-dictionary facilitate age progression of the test subject facial image;

wherein compiling training data comprises: accessing images of different subjects;

mapping a respective detected face in each of the accessed images according to defined landmark coordinates and obtaining a face shape corresponding to each of the respective detected face;

selecting the accessed images according to at least a given criterion, and compiling, in respect of a given gender, at least one training set;

the computer-implemented method further comprises testing the training data, the testing comprising: accessing a training set corresponding in gender to a detected gender of the test subject;

accessing given age-specific dictionaries and common dictionaries, which have been generated for respective shape and appearance aspects, in respect of the given age-groups of the accessed training set;

mapping a detected face of the test subject according to the defined landmark coordinates to obtain a test subject face shape;

aligning the test subject face shape with a common frame respectively computed for each given age-group of the accessed training set;

progressing the aligned test subject face shape in at least a selected age-group of the accessed training set using a corresponding age-specific shape-dictionary and common shape dictionary;

aligning a test subject face appearance with a common frame respectively computed for each given age-group of the accessed training set;

progressing the aligned test subject face appearance in at least the selected age-group of the accessed training set using a corresponding age-specific appearance-dictionary and common appearance dictionary, and combing the progressed aligned face shape and the progressed aligned face appearance of the test subject in at least the selected age-group of the accessed training set; and wherein the testing the training data further comprises: progressing the aligned test subject face shape in a given age-group of the accessed training set by generating respective coding parameters for the age-specific shape-dictionary and the common shape-dictionary, which have been generated in respect of the given age-group, by solving:

subject to the constraint that:

$$y_i^S = D_{0,i}^S c_{i,1}^S + D_i^S c_{i,2}^S + e_i$$

where: S comprises a shape aspect; i comprises an integer allocated to a given age-group of the accessed training set and extends from 1 to K integers for the accessed training set; $\lambda_c$ and $\lambda_e$ comprise respective weighting parameters; $\|\cdot\|_1$, $\|\cdot\|_2$ respectively comprise the $l_1$ and $l_2$ norms and are respectively defined for a vector x as $\|x\|_1 = \Sigma_i |x_i|$ and $\|x\|_2 = \sqrt{\Sigma_i |x_i|^2}$, $e_i$ comprises a sparse vector accounting for non-Gaussian sparse errors; $c_{i,1}^S$, $c_{i,2}^S$ comprise coding parameters for respective allocation to the common shape-dictionary $D_{0,j}^S$ and given age-specific shape-dictionaries $D_i^S$, and $y_i^S$ comprises the aligned face shape of the test subject into a given common frame computed in respect of a given age-group i of the accessed training set.

* * * * *